United States Patent [19]

Fischbeck et al.

[11] 4,233,610
[45] Nov. 11, 1980

[54] HYDRODYNAMICALLY DAMPED PRESSURE PULSE DROPLET EJECTOR

[75] Inventors: Kenneth H. Fischbeck, Dallas; Stig-Göran Larsson; S. Bertil Sultan, both of Carrollton, all of Tex.

[73] Assignee: Xerox Corporation, Stamford, Conn.

[21] Appl. No.: 49,269

[22] Filed: Jun. 18, 1979

[51] Int. Cl.³ .......................................... G01D 15/18
[52] U.S. Cl. ............................................... 346/140 R
[58] Field of Search .................................. 346/140 R

[56] References Cited

U.S. PATENT DOCUMENTS

| | | |
|---|---|---|
| 2,512,743 | 6/1950 | Hansell .................. 346/140 PD |
| 3,683,212 | 8/1972 | Zoltan .................. 346/140 PD X |
| 3,747,120 | 7/1973 | Stemme .................. 346/140 PD X |
| 3,832,579 | 8/1974 | Arndt .................. 346/140 PD X |
| 3,946,398 | 3/1976 | Kyser et al. .................. 346/140 PD X |
| 4,024,544 | 5/1977 | Vernon .................. 346/140 PD X |

FOREIGN PATENT DOCUMENTS 2460573  7/1976  Fed. Rep. of Germany .

*Primary Examiner*—George H. Miller, Jr.

[57] ABSTRACT

An energy dissipative element is used in a pressure pulse drop ejector. The element is designed to efficiently eliminate unwanted meniscus vibration. In one embodiment, one or more relatively thin screens are placed in the liquid flow path to simultaneously damp both hydraulic and acoustic vibrations.

2 Claims, 5 Drawing Figures

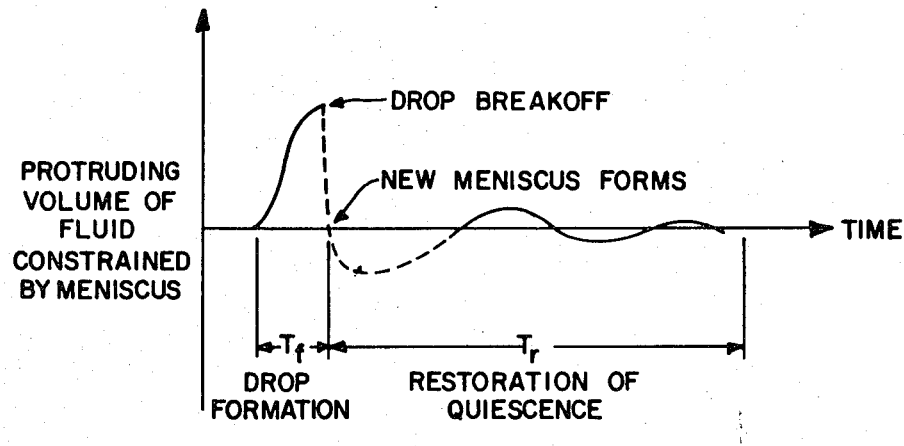

HYDRODYNAMICALLY DAMPED PRESSURE PULSE DROPLET EJECTOR

The invention relates to a pulsed liquid droplet ejecting apparatus wherein one or more energy dissipative elements are placed in the liquid channel to damp hydraulic and acoustic meniscus transients. The invention can be utilized in any pressure pulse drop ejector apparatus; however, the greatest benefits are realized when the dissipative elements of this invention are utilized in an ink jet recorder system. Accordingly, the present invention will be described in connection with an ink jet recording system.

A sufficient pressure pulse addressed to a surface tension constrained liquid in a capillary orifice will cause a minute drop of the liquid to be expressed from that orifice. If the liquid is replenished from a reservoir, the procedure can be repeated at a rate dependent only on the time required for replenishment. Devices based on the above phenomenon are referred to as pressure pulse drop ejectors.

Pressure pulse drop ejectors are used as drop-on-demand ink jet marking devices. Other terms for these devices in the literature are impulse jets, asynchronous jets and negative pressure jets. Advantages of using pressure pulse drop ejectors as marking devices are their mechanical simplicity, quiet operation and ability to put visible ink marks onto plain paper in accordance with a programmed input bit stream.

Pioneering work on pressure pulse drop ejectors was done by C. W. Hansell around 1945 (U.S. Pat. No. 2,512,743). Further significant contribution was made around 1970 by E. L. Kyser and S. B. Sears (U.S. Pat. No. 3,946,398), S. I. Zoltan (U.S. Pat. No. 3,683,212) and E. Stemme (U.S. Pat. No. 3,747,120). Embodiments of the drop-on-demand process, as described by these inventors, all use piezoelectric transducers to convert an electric pulse to a pressure pulse to express a drop from a capillary orifice.

In their patent, E. L. Kyser and S. B. Sears describe an ink jet droplet projector that utilizes the strain of a piezoelectric bimorph to create a pressure pulse in a pressure chamber having an inlet from a reservoir and a nozzle outlet as is shown in FIG. 2 described further herein.

A pulsed droplet ejecting system described by S. I. Zoltan in his patent conceives the pressure pulse to be created by the shrinkage of a piezoelectric tube terminated by a nozzle at one end and an inlet feed tube at the other end as is shown in FIG. 3 described later.

E. Stemme describes a piezoelectric capillary injector in his patent. The liquid between the nozzle and feed line is pulsed by the strain of a thin bilaminar, piezoelectric-metallic plate. As a major difference from the other two concepts, the pulsed liquid addresses the nozzle through a coaxial inner aperture as is shown in FIG. 4, also described later. With this arrangement, the device actually works as an impulse pump. During the pressure pulse, the liquid is injected into the nozzle, and during replenishment, liquid is taken from the liquid layer that lies between the nozzle and inner aperture.

A drop ejection cycle in any of these drop ejectors consists of a drop formation phase and a restoration phase as is illustrated in FIG. 5. It can be described as follows: Increased pressure in the liquid in the pressure chamber causes liquid to protrude from the nozzle. A subsequent pressure decrease causes a contraction in the protruding column of liquid. If the momentum of the incipient drop is large enough, it will detach. After drop detachment, the liquid meniscus retracts toward the nozzle orifice, and the drop ejector settles to its quiescent state. The restoration motions are the transient responses to the dynamic conditions in the drop ejector when the drop breaks off. The free modes of response are both hydraulic and acoustic. Hydraulic modes are given by the gross motion of liquid with restoring forces controlled by the surface tension at the meniscus and by the compliance of the fluid and structure. Their persistence is determined by damping in the fluid circuit. The presence and persistence of acoustic modes are determined by reflection and attenuation of propagating pressure waves in the drop ejector.

A pressure pulse drop ejector can eject drops over a rather wide range of drop rates. At low pulse repetition frequencies, there is no interference between successive drop ejections, and the behavior is independent of applied pulse repetition frequency. At higher frequency, there is interference between successive ejections, due to the restoration transient, and the behavior of the drop ejector is increasingly dependent upon pulse repetition frequency. In fact, in the single drop ejection region, the drop velocity and the drop volume can vary with pulse repetition frequency for a piezoelectric drop ejector. The maximum drop ejection frequency varies up to at least 40,000 drops per second according to design; but, for printing purposes, the frequency has been generally limited to fewer than 3,000 drops per second.

In U.S. Pat. No. 3,832,579, issued Aug. 27, 1974, to John P. Arndt, there are disclosed two methods for overcoming the unwanted acoustic transients. In one method, the waves, which would otherwise be reflected undesirably within the ink channels, are absorbed into viscoelastic ink supply conduit walls, which deform under the influence of the wave and absorb energy therefrom. In the second method for absorbing energy, several forms of acoustic resistance elements are placed within the ink supply conduits at the inlet end of the ink channel. These acoustic resistance elements are characterized therein as being one of the following: a short bundle of glass fibers, minute glass beads fused together, a cylinder of porous plastic or an annular slit. These are not, however, completely satisfactory solutions to the problem of unwanted meniscus vibration. The use of viscoelastic conduit walls to absorb energy is deficient because it is ineffective in damping the hydraulic transients. Further, the teaching in U.S. Pat. No. 3,832,579 is deficient because the deleterious hydraulic oscillations are ignored.

The present invention is intended to provide a more complete remedy to the transient problem. It solves the problem by providing specific flow resistance to the system without substantially increasing flow inertance. This advantage results from the placing of one or more flow resistance elements (screen meshes or other capillary filters) in the ink paths between the ink reservoir, transducer and the outlet orifice.

Heinzl et al, in German patent publication No. 2460573 (1976), have proposed a capillary filter made of sintered chrome nickel steel or porous plastic or simply a steel or plastic grid to be located between the pressure pulse region of the jet and its reservoir to prevent floating air bubbles or dirt from entering the jet. Specifically, the capillaries are stipulated to be so big (ca 30 $\mu$m) that they do not impose hydrodynamic flow resistance.

The present invention, in contradistinction to the teaching of Heinzl et al, requires capillaries so small (ca 5 μm) and short and in such number as to precisely influence the jet hydrodynamics through introduction of flow resistance with minimum added flow inertance.

Embodiments of the invention are described in detail below with reference to the drawings. In each of the figures, parts are given similar number designations for easier understanding.

FIG. 5 is a plot of protruding ink volume versus time demonstrating drop formation and restoration phases as described above.

Figure 1:
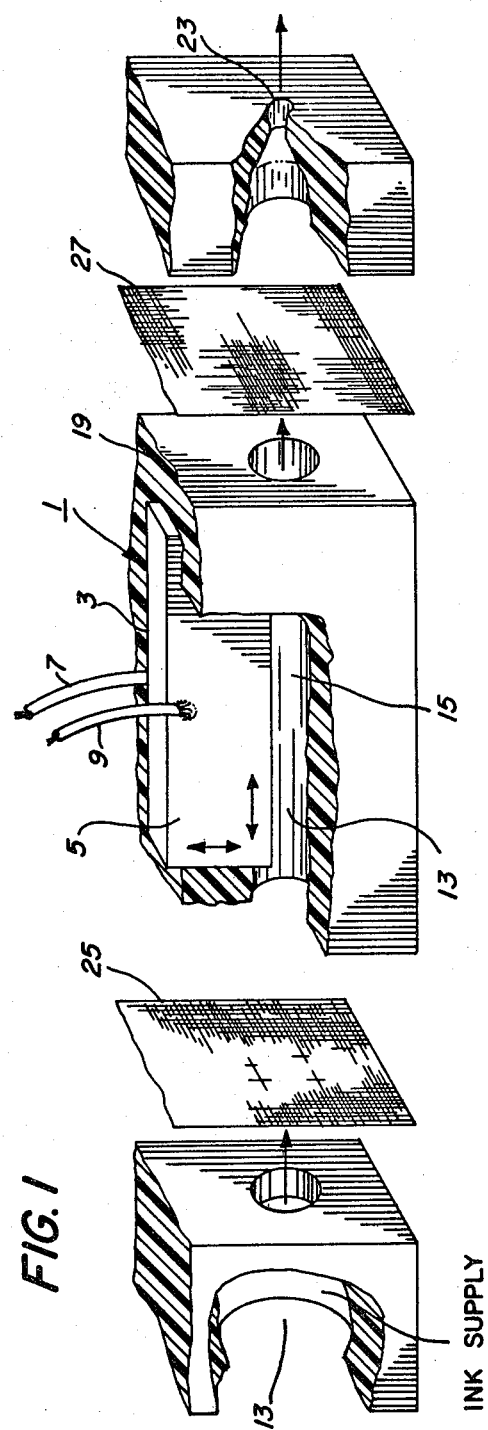
FIG. 1 is a perspective view of an embodiment of the present invention.

FIG. 1 is a schematic representation of a perspective view of an ink jet pressure pulse drop ejector assembly. The figure shows a piezoelectric member generally designated 1. Piezoelectric member 1 is coated on surfaces 3 and 5 with a layer of conductive material. A pulse generator (not shown) is connected to conductive surfaces 3 and 5 by electrical lead wires 7 and 9. Piezoelectric member 1 is polarized during manufacture such that application of the correct polarity electrical potential difference to leads 7 and 9 causes piezoelectric member to contract, that is, to become thinner. When this occurs, piezoelectric member 1 expands in both the X and Y directions. The edge of piezoelectric member 1, opposite the ink channel 15, is rigidly held in place by, for example, clamp means (not shown) so that the resulting Y direction movement is to push into channel 15, which contains liquid ink 13. It can be seen, therefore, that material 19, in which channel 15 is formed, must be relatively insulating since it is in contact with electrodes 3 and 5 and must be flexible enough to allow piezoelectric member 1 to contract and expand and to move far enough to apply sufficient pressure to ink 13 to drive a droplet out of orifice 23. The movement of piezoelectric member 1 into channel 15 causes a pressure (and flow) wave to propagate toward the ink supply reservoir as well as toward orifice 23. Similarly, the dynamic state in which the ink jet pressure pulse drop ejector is left at the moment of drop separation causes fluid reflux with a retrograde pressure wave to propagate in the channel 15. It is necessary for these post-ejection transients to sensibly cease before the drop ejector can be fired again with good control of drop velocity and drop volume. This constraint sets an upper limit on drop ejection rate with controlled drop velocity and drop volume. A way of minimizing the post-ejection transients is to insert suitable flow resistance elements (25, 27) at the refill opening and at the nozzle entrance. Good flow resistance elements typically consist of a plurality of parallel holes with small cross-sectional areas and short lengths. The short length is necessary in order to minimize the flow inertance. This way of minimizing transients has by calculation and experiment been shown to be effective in significantly extending the useful drop repetition frequency of an ink jet pressure pulse drop ejector.

Theoretically, the described ink jet pressure pulse drop ejector consists of channel 15 with the characteristic acoustic impedance approximately given by $$R_o = \frac{1}{S}\sqrt{\frac{\rho}{K}}$$

where
S = cross-sectional area of channel 15
ρ = density of ink 13
K = effective compressibility of ink 13 and walls of channel 15

Nozzle 23 with the approximate formulae for flow resistance $$R_N = \frac{8\mu l_N}{\pi r_N^4}$$

flow inertance $$L_N = \frac{\rho l_N}{\pi r_N^2}$$

and meniscus restoring capacitance $$C_N = \frac{\pi r_N^4}{3\gamma}$$

where
$r_N$ = radius of nozzle 23
$l_N$ = length of nozzle 23
$\mu$ = viscosity of ink 13
$\rho$ = density of ink 13
$\gamma$ = surface tension of ink 13 and flow resistance elements 25 and 27 with the approximate formula for flow resistance $$R_S = \frac{8\mu l_S}{N\pi r_S^4}$$

where
$r_S$ = radius of small hole in element
$l_S$ = length of small hole in element
N = number of small holes in element
$\mu$ = viscosity of ink 13

To be most effective, the dimensions of channel 15 and the flow resistance element 27 are chosen so that the hydraulic oscillation caused by the nozzle inductance and the meniscus restoring capacitance is critically damped or slightly underdamped. At the same time, the resistance element 25 must be chosen to match the characteristic acoustic impedance of channel 15.

By way of example, the calculated flow resistance is obtained by using fine mesh screens as resistance elements 25 and 27. They are electroformed nickel screens with 25 μm wires, 10 μm hole length and 7 μm square holes, the screen being available from Buckbee-Mears Company, Saint Paul, Minn. Piezoelectric member 1 is made of piezoceramic PZT-5H, available from Vernitron Piezoelectric Division, Bedford, Ohio, and measures 0.25 mm thick by 5 mm wide and 15 mm long. Channel 15 measures about 0.75 mm in diameter and has an orifice 23 of about 50 μm in diameter. A voltage pulse of about 50 volts at pulse frequencies up to 8 kHz has provided excellent results.

In general, for normal inks and operating in a frequency range suitable for most printing applications, it is desirable to have flow resistance elements with holes of diameters ranging from about 1 μm or less to a maximum of about 15 μm and lengths ranging from about 1 μm to about 50 μm. The number of holes, of course, depends on hole diameter and channel 15 dimensions.

Figure 2:
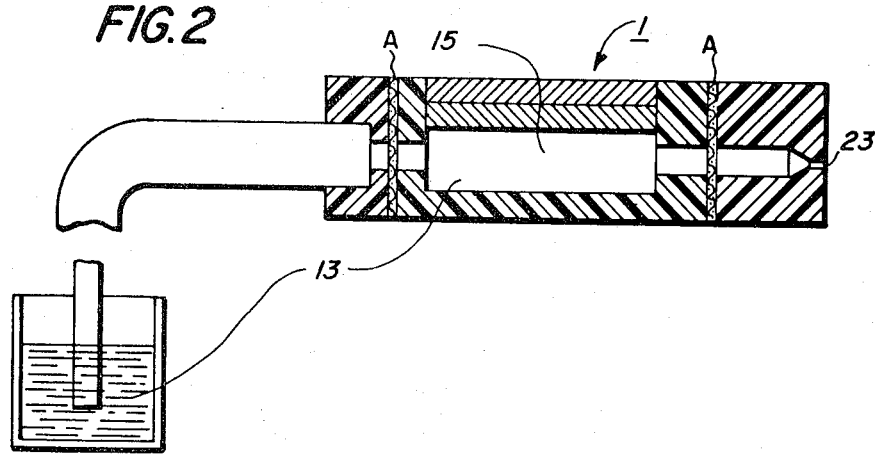
FIGS. 2-4 are side sectional views of prior art jets showing where resistive elements may be usefully employed.
Figure 3:
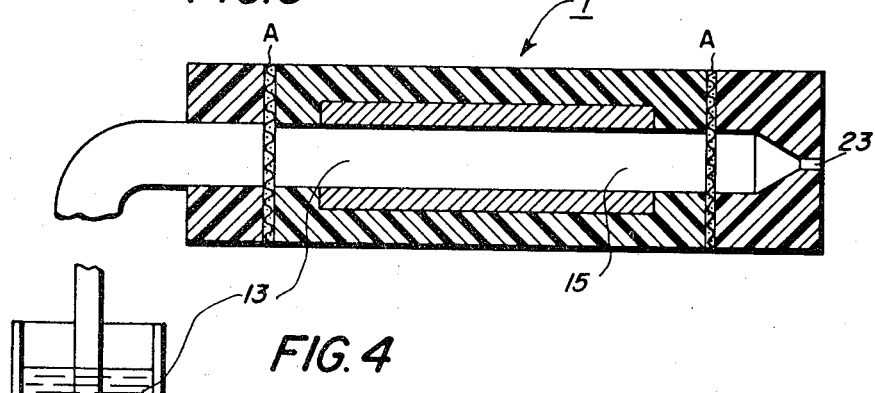
Figure 4:
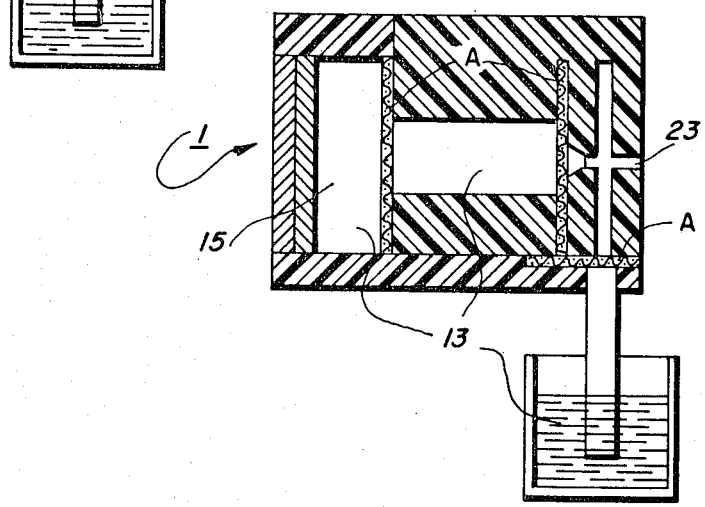

Referring again to FIGS. 2, 3 and 4, the dotted lines A illustrate fluid resistor locations where analysis and experiment demonstrate improved device performance in terms of higher drop frequency with controlled drop velocity and volume. Fluid resistive elements, such as sintered metal or ceramic filters, may be used in place of the fine screens described herein for the same purpose provided that they offer multiple parallel fluid paths of controlled short length and narrow diameter so that their hydraulic and acoustic impedance may be optimally selected.

Although a specific embodiment and specific components have been described, it will be understood by one skilled in the art that various changes in the form and details may be made therein without departing from the spirit and scope of the invention. For example, the invention may be used with various electro- or magnetostrictive elements in place of the piezoelectric transducer described herein. In particular, the benefit of the resistive elements of this invention may be utilized in apparatus such as those shown in U.S. Pat. Nos. 3,832,579, 3,946,398 and 4,024,544.

What is claimed is:

1. A pulsed pressure drop ejecting apparatus wherein a transducer (1) is utilized to compress liquid (13) in a channel (15) to express a droplet from an orifice (23) upon application of a signal to the transducer (1), the improvement comprising the addition of at least one energy dissipative element (25, 27) in the channel (15) so as to achieve simultaneous acoustic impedance matching and near critical hydraulic damping.

2. The apparatus of claim 1 wherein the energy dissipative element is a screen having holes with a diameter of from about 1 μm to about 15 μm, and the holes having a length of from about 1 μm to about 50 μm.

* * * * *